United States Patent [19]

Anderson

[11] 4,253,784

[45] Mar. 3, 1981

[54] DRILL GUIDE ASSEMBLY

[76] Inventor: Robert O. Anderson, 203 Sunset Point Dr., New Port Richey, Fla. 33552

[21] Appl. No.: 56,455

[22] Filed: Jul. 11, 1979

[51] Int. Cl.[3] .......................... B23B 47/28; B23B 39/00

[52] U.S. Cl. ................................ 408/115 R; 408/72 R

[58] Field of Search ............... 408/72 R, 72 B, 115 R, 408/115 B, 241 R, 241 B, 241 G

[56] References Cited

U.S. PATENT DOCUMENTS

| | | | |
|---|---|---|---|
| 1,237,143 | 8/1917 | Allen | 408/72 B |
| 2,515,383 | 7/1950 | Sneva | 408/72 B |
| 2,602,238 | 7/1952 | Wellman | 408/115 |
| 3,598,496 | 8/1971 | Skinner | 408/115 |
| 3,804,546 | 4/1974 | Boyajian | 408/115 |

*Primary Examiner*—Harrison L. Hinson
*Attorney, Agent, or Firm*—Arthur W. Fisher, III

[57] ABSTRACT

A drill guide assembly including a guide having a base with a predetermined transverse dimension and a plurality of guide channels formed therein in spaced apart relation wherein the transverse dimension of the base is sufficient to provide a linear path of travel of a drill bit passing therethrough and into a work piece. A positioning arm attachable at least one of two spaced apart points along the length of the base wherein the positioning arm has one end engaging the work piece so as to establish a predetermined angular orientation between the work piece and the base and particularly the drill passing through the base into the work piece.

5 Claims, 3 Drawing Figures

DRILL GUIDE ASSEMBLY

BACKGROUND OF THE INVENTION

1. Field of the Invention

This invention relates to a drill guide assembly of the type specifically structured to orient a drill bit through the base of the guide into a work piece at a predetermined angular orientation and further including a positioning assembly to alter the relative position between the base of the drill and the work piece itself such that the angular engagement of the bit into the work piece may be varied.

2. Description of the Prior Art

Numerous types of drill jigs and drill guides have been known for many years. Conventionally such type structures serve to at least partially direct the bit of a drill or like tool into a specific location of a work piece. Such known or prior art structures vary greatly in complexity depending upon the particular application for which they are used. However, few if any of such structures are particularly adapted for simple widely varied use capable for a variety of applications such as in a "handyman" operation.

U.S. Pat. Nos. 2,466,023, to Griffin; 2,475,263, to Staggs; and 2,273,954, to Grass disclose drill jig type structures specifically designed for the at least minimal guiding of drill bits into work pieces in a predetermined number of times at various locations.

Similarly U.S. Pat. Nos. 2,990,733, to Garcia; 3,775,020, to Stoutenberg; and 3,804,546, to Boyajian; disclose drill guide type structures wherein various drill bits of various sizes may be applied to a work piece in a predetermined location or in a predetermined pattern.

Again, however, structures of the type disclosed in the aforementioned patents all include devices which do not readily lend themselves to a variety of work applications so as to reach hard to locate areas on a work piece or wherein the angular relation of the drill bit as it enters the work piece can be determined and/or varied. Accordingly, there is an obvious need in the industry for a simple, inexpensive and efficient drill guide structure wherein the angular relation between the drill bit and the work piece itself, as the drill bit enters the work piece, can be predetermined and/or varied due to the specific structure of the drill guide assembly itself.

SUMMARY OF THE INVENTION

This invention relates to a drill guide assembly comprising a guide means having a base with a predetermined transverse dimension. A plurality of guide channels are formed in the base in spaced apart relation to one another wherein the transverse dimension of the base is sufficient to provide a linear path of travel through which the drill bit can pass. This serves to guide the drill bit into a predetermined angular orientation as it enters the work piece.

A shield means is provided which, in one embodiment includes a single plate extending along an outer longitudinal surface of the base. The plate is made from material having sufficient degree of hardness to resist penetration of the drill bit during its application to the base. An access means comprises a plurality of apertures formed in the plate of the shield wherein the apertures and the drill guide channels are disposed in aligned relation to one another when the plate is itself disposed in covering, protective relation to the exterior surface of the base.

Another embodiment of the present invention comprises the shield means comprising two plates mounted on oppositely disposed longitudinal exterior surfaces of the base wherein each of the plates comprise a plurality of apertures wherein each of the apertures are disposed in aligned relation with at least one of the drill guides.

The drill guides themselves may vary in internal diameter to be adaptable to the drill bits of various sizes. Accordingly, the drill guide assembly of the present invention may accommodate various size drill bits wherein such drill bits may be guided in a predetermined angular orientation to the work piece as the bit enters the work piece.

Further structural features of the present invention comprises a positioning means which is attached at one of at least two points along the length of the base. The positioning means comprises an elongated arm having a slot or the like formed therein and extending along the length. A connector means is disposed in mounted relation at one or both of the two spaced apart points and adaptable for sliding engagement relative to the slot in the arm of the positioning means. Relative positioning of the connector to various points along the length of the slot in turn varies the angular orientation of the base of the guide relative to the work piece on which it is mounted. In actual operation one free end of the positioning means is mounted on a surface of the work piece to be drilled. The base is attached at some point along the length of the work piece by mounting the connecting assembly or means within the slot in a supported fashion. Varying positioning of the connector means relative to the length of the positioning means in turn varies the angular orientation of the base to the work piece and therefore varies the angular orientation of a drill bit as it passes through one of the drill guide channels into the work piece.

The positioning means may be removably connected to either one of the two spaced apart points of connection on the base. This allows the positioning means to be effectively positioned at what may be determined opposite ends of the base so as to enable drill bits of shorter lengths to be used irrespective of the dimension of the drill bit and properly position at the desired angle into penetrating relation to the work piece itself.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
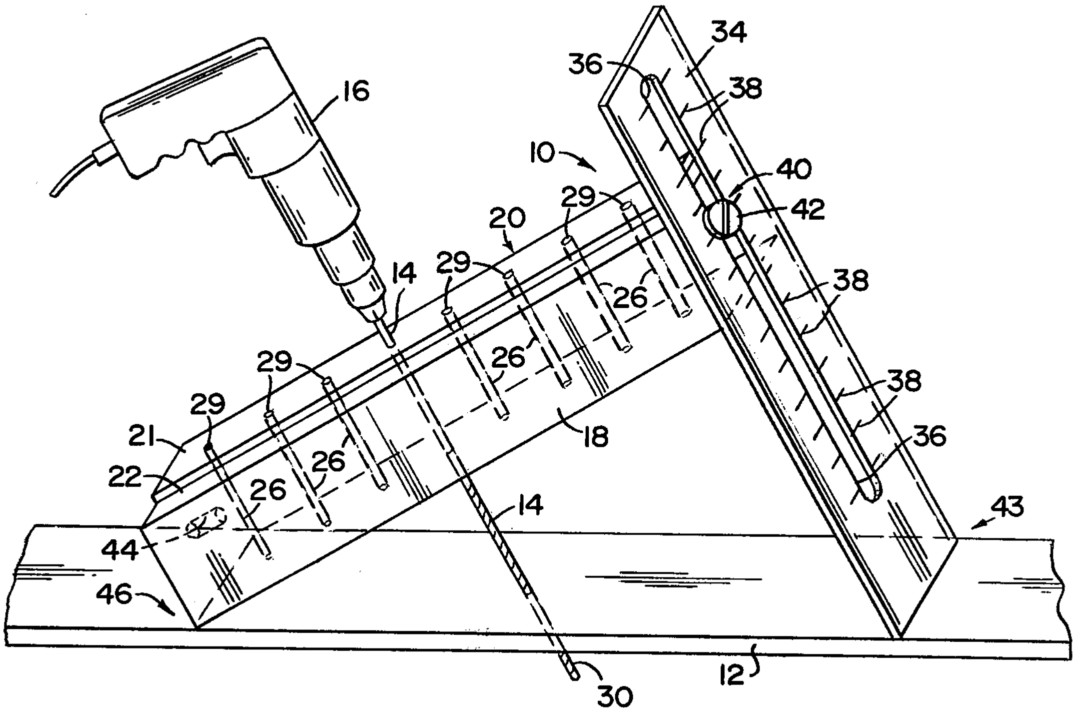
FIG. 1 is isometric view of the drill guide assembly relative to a work piece.
Figure 2:
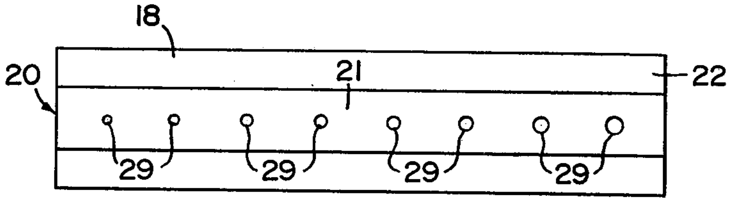
FIG. 2 is a top plane view of the guiding base of the guide assembly.
Figure 3:
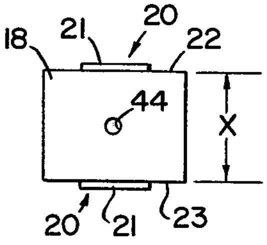
FIG. 3 is an end view of the embodiment of FIG. 2.

With regard to FIG. 1 the drill guide assembly of the present invention is generally indicated as 10 and is shown in operative relation relative to a work piece 12 for the purpose of guiding a drill bit 14 into the work piece 12. Such drill bit 14 can be powered by a hand drill 16 or other conventional type of equipment. The guide assembly of the present invention comprises a base means 18 having a generally elongated configuration and further having a transverse dimension or thickness generally indicated as x of sufficient length to provide a linear path of direction of the drill bit 14 as it passes through the base into the work piece. The base means includes a shield means generally indicated as 20 in the form of an elongated plate 21. The plate is made from a metal or generally hard material which is resistent to the penetration of the drill bit. In regard to FIG. 3, one embodiment of the present invention comprises the shield means 20 being mounted on opposite surfaces 22 and 23 and extending along substantially the entire length of the base means 18.

A plurality of guide channels 26 are formed in the base means 18 and extend through the entire transverse dimension thereof as best shown in FIG. 1. Each of the guide channels is configured to have a greater internal diameter size than the next previous guide channels such that each of the guide channels increase in diameter from one end of the base means 14 to the other. The different sizes are provided to accomodate drill bit 14 of various sizes as they pass through the base means through one of the guide channels and into the work piece 12. The linear configuration of each of the guide channels 26 is such as to force the drill bit 14 passing through one thereof into the work piece 12 in the same linear path defined by the channel itself.

In addition, the shield means 21 including the elongated plate has entrance apertures 29 disposed in aligned relation with each of the guide channels 26 for the purpose of allowing entrance of the point 30 of the drill bit into the guide channels. It should be obvious that when incorporating the structure of the embodiment of FIG. 3 both at the oppositely disposed shield plates 21 have entrance apertures 29 disposed in lined relation with opposite ends of the guide channels 26. For purposes of functioning individual guide channels 26, as shown, are disposed in spaced apart, substantially parallel relation to one another and each of the guide channels are arranged in substantially transverse or perpendicular to the longitudinal axis of the base means 18.

Other structural features of the present invention comprise a positioning means generally indicated as 32 including an elongated arm member 34 having an elongated slot 36 formed therein to extend substantially along a major portion of the length thereof. This slot in addition has individual markings or indices 38 form along the length thereof for the purpose of clearly indicating predetermined positions at which to position the connector means generally indicated as 40 relative thereto. The connecting means itself comprises a connector element 42 designed to pass through the slot and into appropriately positioned apertures 44 formed in each end of the base means 18 to receive a connector element 41 therein. Accordingly connector element maintains one end of the base means 18 at a predetermined position along the length of the elongated arm member 34 for the purpose of orienting the base means 18 at a predetermined angle relative to the work piece 12. As best shown in FIG. 1 oppositely disposed free ends of the elongated arm of the positioning means as at 44 and of the base means as at 46 are disposed in actual contact with the work piece 12 wherein the opposite end of the base means 18 is fastened at a predetermined point along the length of the arm 34. This of course determines proper angular orientation, as desired, of the base means 18 relative to the work piece and also properly angularly orients the guide channels 26 relative thereto. Therefore, when the drill bit 14 passes through any one of the appropriately sized guide channels 26 it automatically enters the work piece 12 at the desired or intended angle.

It should further be obvious that the base means 18 may be disposed flush to the work piece thereby disposing the guide channels 26 substantially perpendicular to the exposed surface thereof. This will in turn serve to guide the drill bit 14 to the work piece in a straight, substantially perpendicular relation to the surface exposed thereof. In such use, the positioning means 32 need not be utilized.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A drill guide assembly for directing a drill bit into a work piece at a predetermined relative orientation, said assembly comprising: guide means having a base and including a plurality of guide channels formed in said base, in spaced apart relation to one another and extending transversely through said base, the transverse dimension of said base and of each of said plurality of guide channels being sufficient to direct movement of a drill bit through any of said guide channels in a substantially linear path of travel into said work piece; shield means secured substantially adjacent one exterior surface of said base and including axis means disposed in aligned communicating relation to said plurality of guide channels and configured to allow passage therethrough of a drill bit into and through any one of said plurality of guide channels, said shield means formed from a material of sufficient hardness to resist penetration of the drill bit therein, positioning means movably secured to said base and disposed in supporting engagement between said base and the work piece and positioned to orient said base in angular orientation relative to the exposed working surface of the work piece, connecting means secured to at least point along the length of said base and movably engaging said positioning means so as to movably interconnect said base and said positioning means, whereby angular orientation between said base and the work piece varies as said positioning means is moved and reoriented relative to said base, said connecting means is positionable at either of at least two spaced apart points along the length of said base, and either of said aforementioned positions is connectable with said positioning means, said base disposed in reversed angular attitude relative to the work piece upon securing said positioning means with opposite of said two spaced apart points.

2. A drill guide assembly as in claim 1 wherein said axis means comprises a plurality of apertures each disposed in aligned communicating relation with one of said plurality of guide channels, said plurality of apertures and each of said correspondingly positioned guide channels having substantially equivalent dimensions.

3. A drill guide assembly as in claim 2 wherein a number of said plurality of apertures having different dimensional diameters each of which corresponds to a different size drill bit.

4. A drill guide assembly as in claim 1 wherein said positioning means comprises an arm element having a substantially elongated configuration, slot means integrally formed in said arm and extending along a predetermined length of said arm, said slot configured to have its peripheral portions slidingly engaging said connecting means to effect relative movement between said arm and said base.

5. A drill guide assembly for directing a drill bit into a work piece at a predetermined relative orientation, said assembly comprising: guide means having a base and including a plurality of guide channels formed in said base, in spaced apart relation to one another and extending transversely through said base, the transverse dimension of said base and of each of said plurality of guide channels being sufficient to direct movement of a drill bit through any of said guide channels in a substantially linear path of travel into said work piece; shield means secured substantially adjacent one exterior surface of said base and including axis means disposed in aligned communicating relation to said plurality of guide channels and cofigured to allow passage therethrough of a drill bit into and through any one of said plurality of guide channels, said shield means formed from a material of sufficient hardness to resist penetration of the drill bit therein, said shield means comprises two plate elements secured in oppositely disposed relation to opposite exterior surfaces of said base and extending along the length thereof in covering, protective relation to said surfaces of said base, both said plates structured to provide access to said guide channels.

* * * * *